Figure 7:
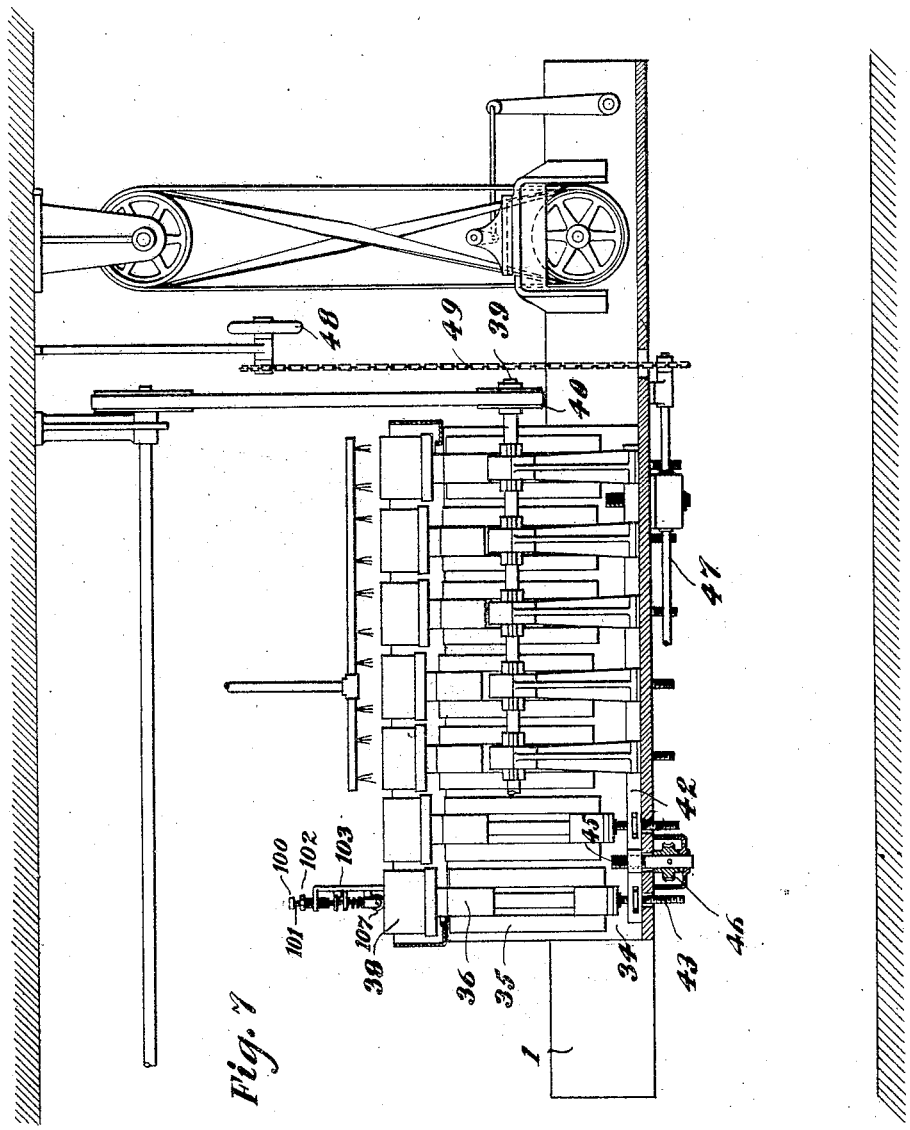

G. M. TREMMEL.
GLASS BEVELING MACHINE.
APPLICATION FILED OCT. 26, 1911.
1,049,550.
Patented Jan. 7, 1913.
7 SHEETS—SHEET 1.
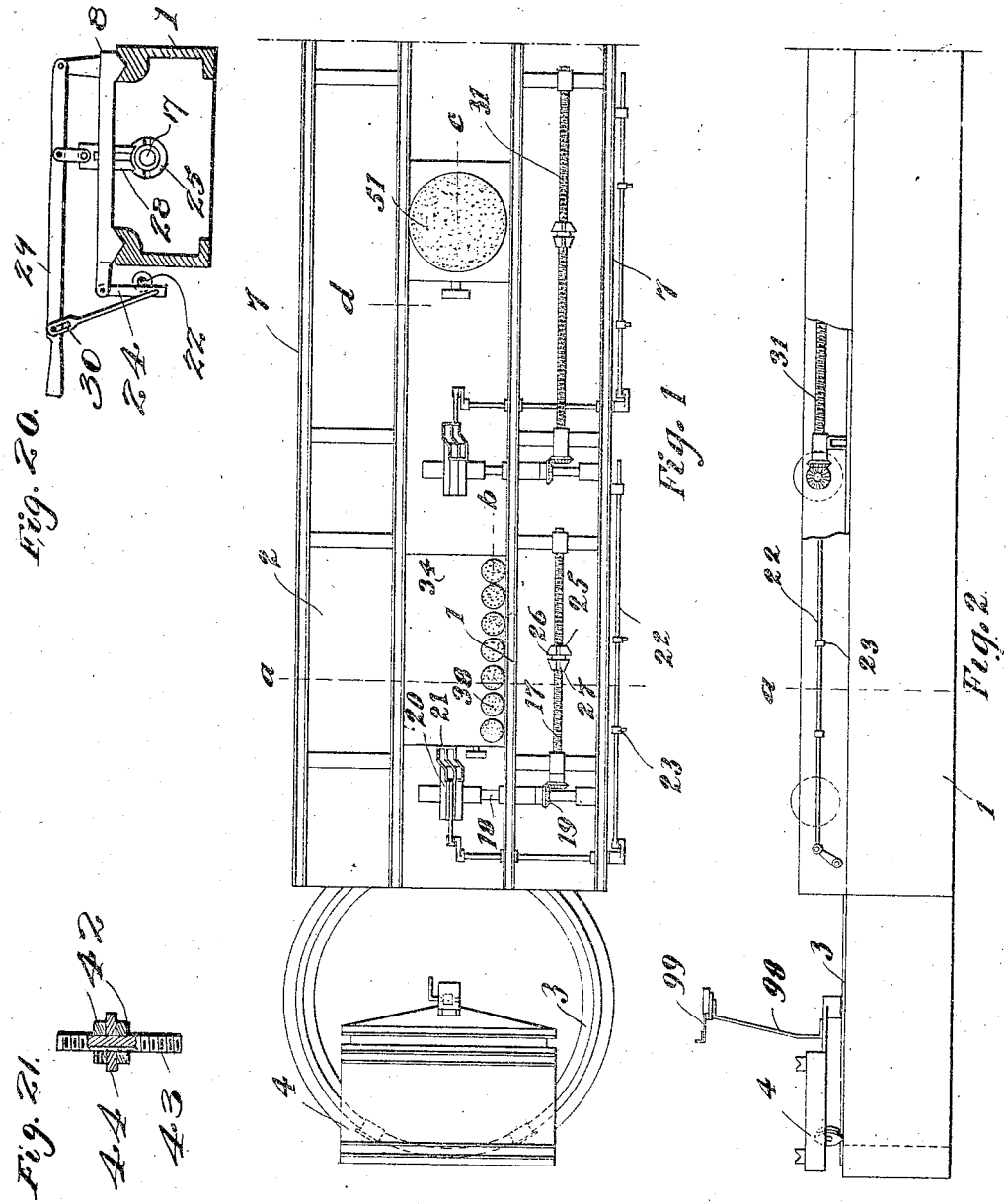
Witnesses.
Inventor.
George M. Tremmel.
by James W. See
Attorney.

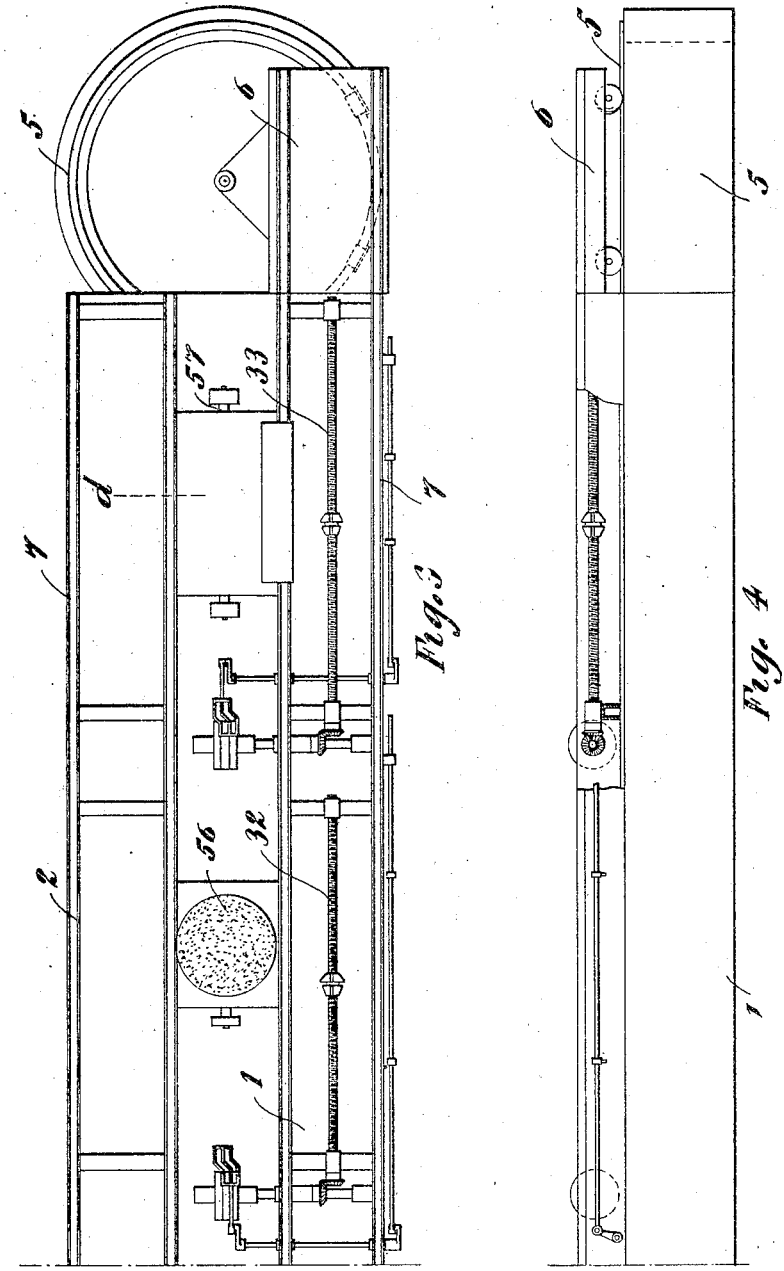

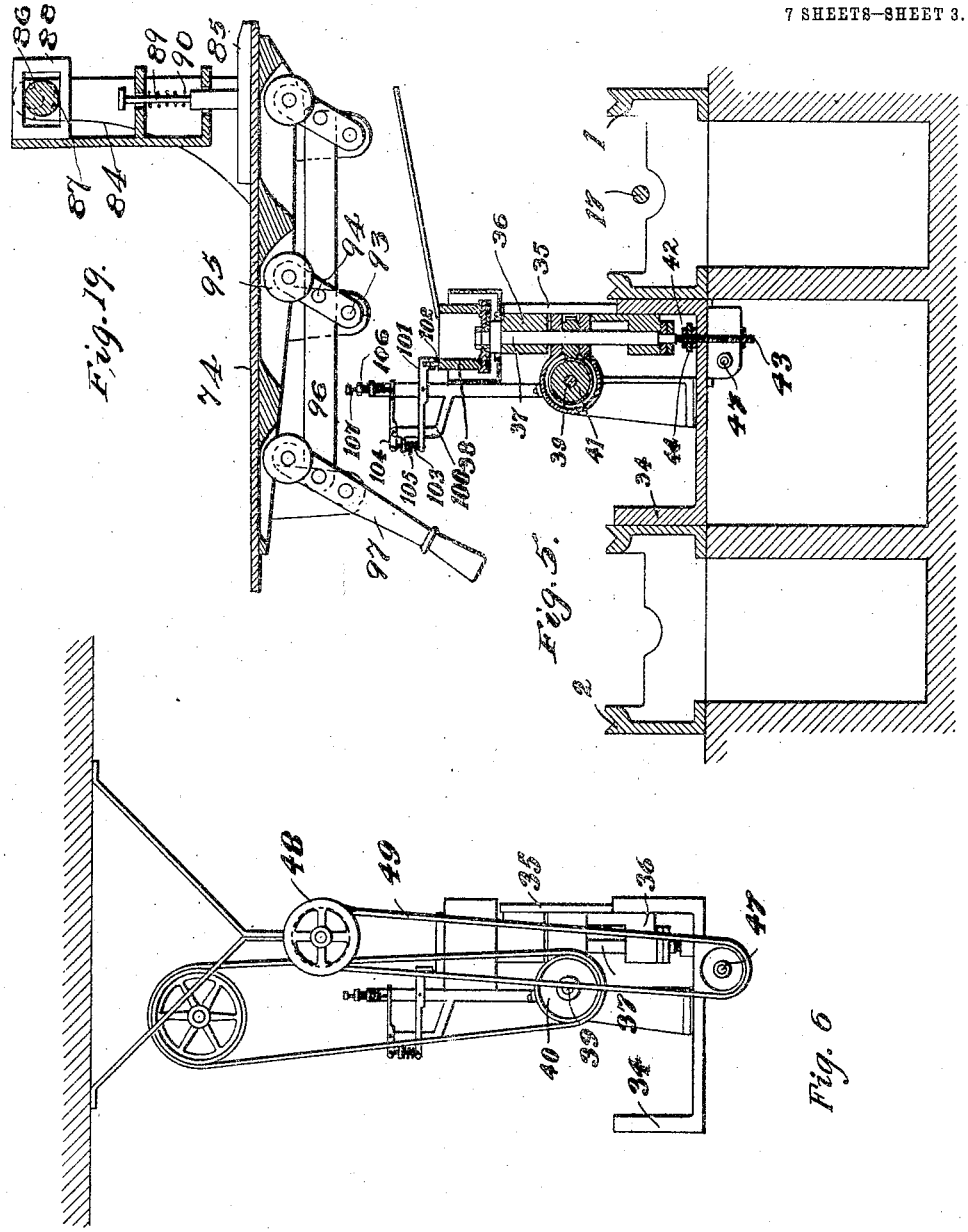

G. M. TREMMEL.
GLASS BEVELING MACHINE.
APPLICATION FILED OCT. 26, 1911.

1,049,550.

Patented Jan. 7, 1913.
7 SHEETS—SHEET 4.

Witnesses.
Victor E. Julian
Geo. Johnson.

Inventor:
George M. Tremmel.
by James W. See
Attorney.

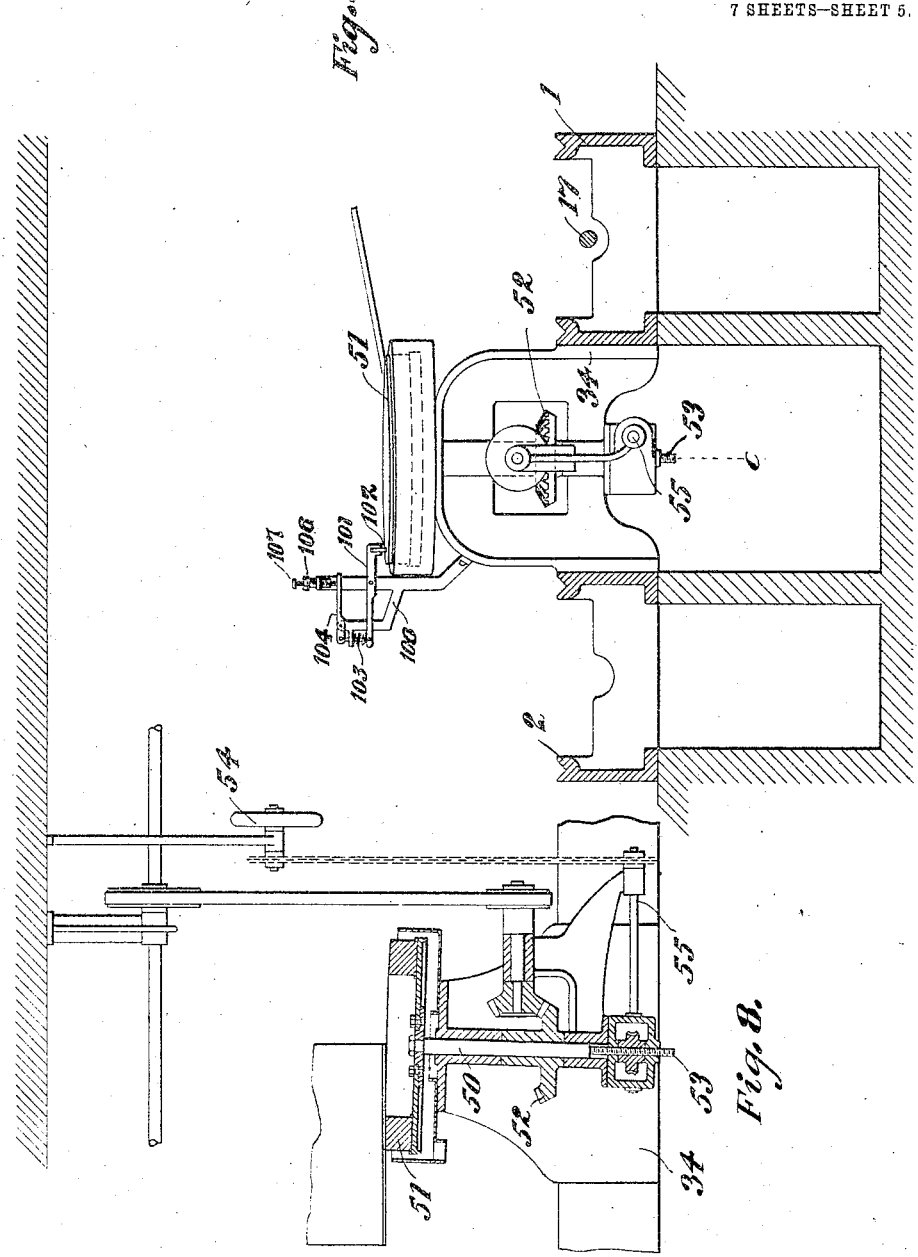

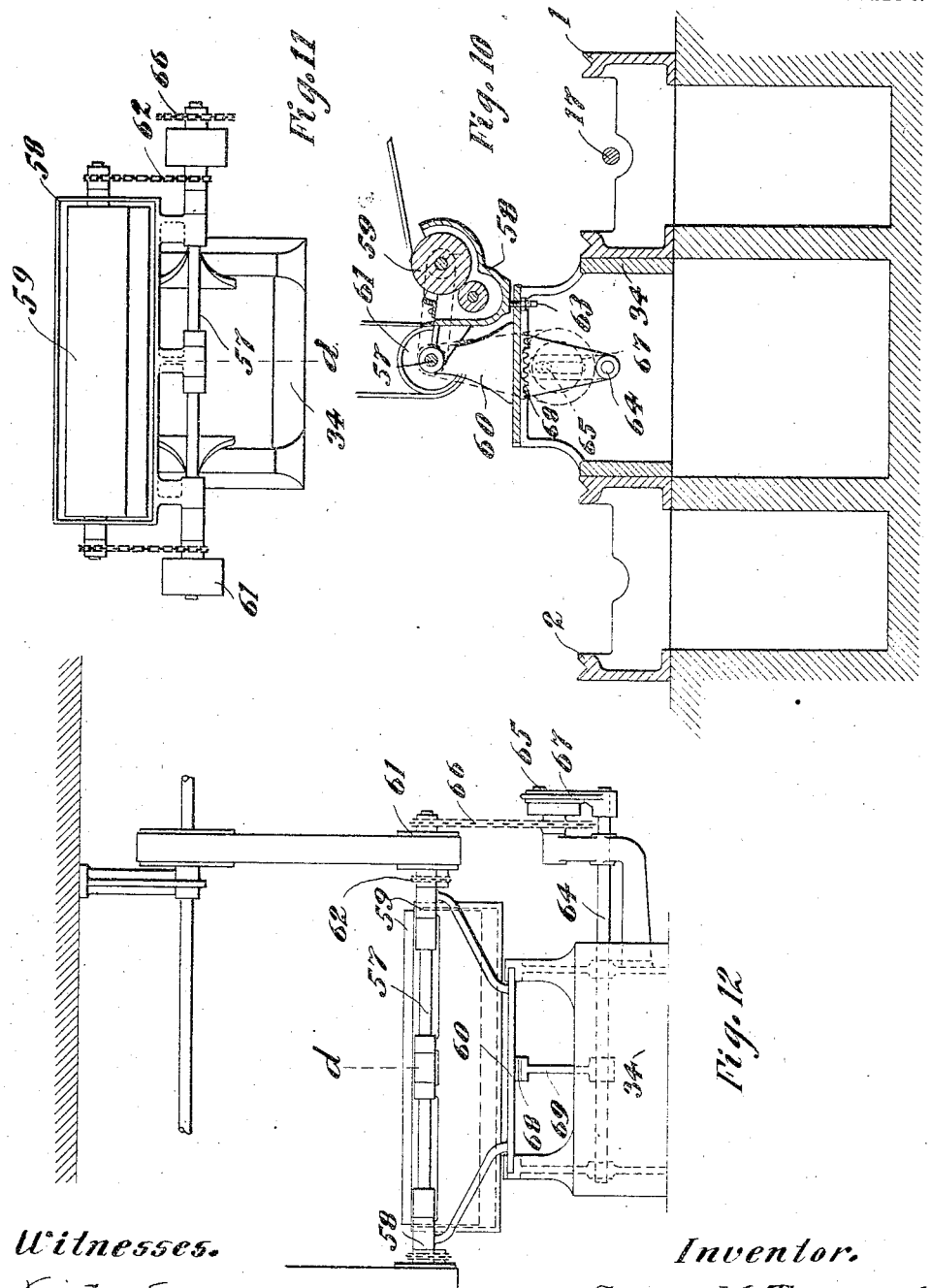

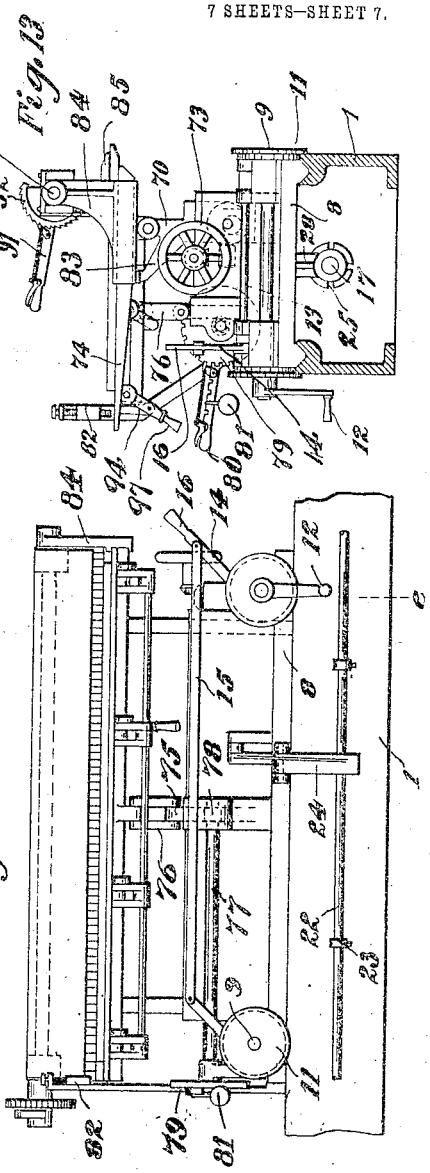

UNITED STATES PATENT OFFICE.

GEORGE M. TREMMEL, OF TWO RIVERS, WISCONSIN, ASSIGNOR TO THE TREMMEL ART GLASS WORKS, OF TWO RIVERS, WISCONSIN.

GLASS-BEVELING MACHINE.

1,049,550.  Specification of Letters Patent.  Patented Jan. 7, 1913.

Application filed October 26, 1911. Serial No. 356,927.

*To all whom it may concern:*

Be it known that I, GEORGE M. TREMMEL, a citizen of the United States, residing at Two Rivers, Manitowoc county, Wisconsin, have invented certain new and useful Improvements in Glass-Beveling Machines, of which the following is a specification.

This invention relates to an improved machine for cutting the bevels on the edges of glass plates. I provide a long main trackway of a form similar to the bed of a metal planer and on this trackway is mounted a movable carriage for properly supporting the glass plate to be beveled. Alongside this trackway is disposed a return trackway and at the ends of the trackways there are provided transferring turntables. A carriage may move along the main trackway and be transferred to and return on the return trackway, and so on in a circuit.

The glass plate is so supported on the carriage that its surface is at such angle to the horizontal as corresponds with the angle of the bevel to be produced on the edge of the glass and, at one side, and in an early portion of the length of the main trackway, there is mounted, on a vertical axis, a grinding wheel, preferably of cupped form, to operate on the margin of the glass with its flat face. Several of these grinding wheels may be arranged in succession near each other. Power mechanism reciprocates the carriage on that portion of the main trackway corresponding with the set of grinding wheels referred to, and, as the carriage reciprocates, the grinding wheel or wheels cut away the glass and produce the roughing work on the bevel to be produced.

The roughing having been produced the carriage is disconnected from its reciprocating mechanism and is shifted farther along upon the main trackway and again set into reciprocation, but this time in conjunction with grinding wheels of finer quality to produce the finishing cut upon the glass and, when the finishing is done, the carriage is shifted farther along on the main trackway and the bevel of the glass subjected to the action of buffing mechanism, there being disposed along the main trackway, the roughing wheels, the finishing wheels, and the buffing mechanism, all but the buffer being on vertical axes and working upon the glass with their flat faces and, if desired, the main trackway may be made long enough to accommodate additional grinding agents if a more gradual process be desired.

When the buffing has been entirely completed then the carriage is run onward and to a turntable and is reversed and transferred to the return track and, the glass plate having been shifted to bring a new edge into position to be operated upon, the carriage is moved to the second turntable and by it transferred again to the main trackway, the new edge of the glass plate now going through the process before described. There may be any desired number of the carriages arranged in succession so that while one glass plate is being subjected to the roughing operation another plate may be subjected to the finishing operation, and another plate to the buffing operation, and another plate to readjustment to bring a new edge of the plate to position for being operated upon.

A given carriage is reciprocated past the grinding agency operating upon it by automatic reciprocating means, and when the work of that grinding agency is over the carriage may be shifted by hand to the field of the next grinding agency and there put in connection with the second automatic reciprocating mechanism, and so on, and the carriage may be shifted by hand from the main trackway to the first turntable and then along the return trackway and then to the second turntable and back to the main trackway. While the carriage is reciprocating upon the main trackway it has an accurate sliding motion thereon, and when the carriage is to be shifted by hand antifriction wheels are brought into play to slightly elevate the carriage from the slides of the trackway and permit the carriage to be easily shifted along the track by hand. Facilities are provided for securing the glass plate to the carriage and for adjusting it thereon to secure the desired angle of beveling.

The accompanying drawings illustrate the preferred embodiment of my invention.

As the machine is of considerable length, a length too great to be shown upon a single sheet, Sheets 1 and 2 are to be studied as though the figures on Sheet 2 were joined endwise at the right of the figures on Sheet 1.

In the drawings:—Figure 1 is a plan of the lefthand portion of the trackways: Fig. 2 a side elevation of the same: Fig. 3 a plan of the righthand portion of the trackways: Fig. 4 a side elevation of the same, it being understood that Figs. 1, 2, 3 and 4 are to be viewed as though Figs. 3 and 4 were joined to the righthand end of Figs. 1 and 2 to exhibit the full length of the machine. Fig. 5 a vertical section through the main and return trackways in the plane of line a of Figs. 1 and 2; Fig. 6 an end view of the stretcher-piece disposed between the two trackways and supporting a group of the grinding wheels; Fig. 7 a vertical longitudinal section of the stretcher piece, the group of roughing grinders and the carriage driving mechanism appearing in elevation, the section of the stretcher-piece appearing in the plane of line b of Fig. 1; Fig. 8 a vertical transverse section of the medium grinder in the plane of line c of Figs. 1 and 9; Fig. 9 a vertical transverse section of the two trackways in the plane of line d of Fig. 1, this view showing the medium grinder and its mounting. Fig. 10 a vertical transverse section of the trackways in the plane of line d of Figs. 3, 11 and 12; this view also showing the buffer in vertical section; Fig. 11 a plan of the buffer; Fig. 12 a side elevation of the buffer; Fig. 13 an end elevation of the carriage with its equipment; Fig. 14 a side elevation of the same; Fig. 15 a vertical section through one of the vertically movable bearings for the shafts of the carriage wheels, the section being in the plane of line e of Figs. 14 and 16; Fig. 16 a vertical section of the guide for one of these bearings, in the plane of line f of Fig. 15; Fig. 17 a side elevation of one of the table-hinge plungers; Fig. 18 a front elevation of one of these plungers and its adjusting mechanism; Fig. 19 a side elevation, part vertical section, of the carriage table; Fig. 20 a vertical transverse section of the main trackway in the plane of line a of Figs. 1 and 2, the carriage appearing on the trackway in end elevation; and Fig. 21 a vertical section of the support and elevating nut for one of the grinding-spindles.

There is a diversity of scale among the various figures of the drawings.

In the drawings, and giving immediate attention particularly to Figs. 1 and 3:—1, indicates a main trackway on which a plate-carrying carriage may accurately slide, this trackway being preferably of a construction substantially like that found in the beds of ordinary metal planing machines: 2, a return trackway, disposed parallel with the main trackway: 3, a semicircular track at the lefthand end of the two trackways: 4, a turntable mounted on track 3 and bearing a trackway corresponding with the main and return trackways and adapted to be so turned as to bring its trackway into alinement, alternatively, with either the main trackway or return trackway, the trackway of the turntable being of sufficient length to receive the plate-carrying carriage: 5, a turntable trackway at the righthand end of the main and return trackways: and 6, a turntable, like turntable 4, but disposed at the righthand end of the main and return trackways.

Assuming a plate-carrying carriage to be at the lefthand end of the main trackway 1, that carriage may be moved to the right and, turntable 6 being in position to aline with the main trackway, the carriage may be moved onto the turntable and, the turntable with its carriage being then moved into alinement with the return trackway, the carriage may be moved to the left on the return trackway and received by the turntable 4 by means of which the carriage may be again transferred to the lefthand end of the main trackway, it thus being possible to move the carriage in a continuous circuit. It may be here stated that the work of producing the bevel on the edge of the glass plate is to be done while the plate is moving on the main trackway, the plate eventually being carried to the righthand end of the main trackway, after which the turntables and the return trackway serve as means by which the plate-carriage can be again started at the lefthand end of the main trackway, it being understood that there may be several plate-carriages on the trackway.

Proceeding with the drawings:—7, indicates portions of the trackways adapted to be engaged by wheels on the carriage: 8, the base of the carriage which is adapted to slide on the trackways (Figs. 13 and 14): 9, wheel-shafts disposed across the carriage: 10, vertically movable bearings for the wheel-shafts: 11, anti-friction wheels fast on the wheel-shafts and adapted to roll upon some portion of the trackways, preferably the portions 7 at the outside of the slideways on which the carriage slides on the trackways, the diameter of these wheels and the vertical position of the bearings being such that normally the wheels will be up and free from the trackways or roll idly upon them so as to bear no carriage load sufficient to interfere with the carriage having sliding engagement with the trackways: 12, a handle on one of the wheel-shafts, by means of which, when the wheels are bearing the load of the carriage, one pair of the wheels may be turned so as to propel the carriage along the trackway: 13, a cam-shaft mounted in the carriage over each wheel-shaft and provided with cams engaging the bearings of the wheel-shafts in such manner that proper angular adjustment of the cam-shafts will elevate the carriage sufficiently to relieve the carriage from sliding engagement with the trackway and bring the load upon the wheels: 14, an arm on each cam-shaft: 15, a link connecting the two arms: and 16, a handle on one of the arms.

Normally, the carriage will be in sliding engagement with the trackway, but by manipulating handle 16 the load of the carriage may be put upon the wheels thus permitting the carriage to be shifted along the trackway by hand. While the carriage is making its active motions past the grinding agencies, which it does while on the main trackway, the carriage will have an accurate sliding motion on the trackway. The main trackway, as will be later explained, is divided into several successive sections of operations, four in the illustration, somewhat separated from each other and the carriage, while sliding in these sections, is to be operated by power, but when the carriage is to be fleeted from one section to the other or onto and off of the turntables or along the return trackway, the carriage wheels are to be brought into action and the carriage moved by hand.

Proceeding with the drawings:—17, indicates a longitudinal feed-screw mounted in the first operating section of the main trackway, the section at the lefthand end of that trackway: 18, a cross-shaft mounted near one end of this feed-screw: 19, gearing connecting the cross-shaft with the feed-screw: 20, tight and loose pulleys on the cross-shaft, adapted to receive motion from shifting open and crossed belts and to give motion in one direction or the other to the feed-screw: 21, a belt-shifter to coöperate with the belts to bring about a rotation in either direction or a condition of rest on the part of the feed-screw: 22, a tappet-rod extending along the first operated section of the main trackway and connected, in an obvious manner, with the belt-shifter so that movement of the rod in one direction will so shift the belts as to turn the feed-screw in one direction, while the endwise movement of the rod in the opposite direction will shift the belts to turn the screw in the opposite direction: 23, a pair of tappets fast on the tappet-rod but adjustable along the rod: 24, a tappet-arm hinged to the carriage and depending therefrom as to lie contiguous to the tappet-rod, between the tappets, and adapted to swing so far away from the tappet-rod as to clear and pass over the tappets: 25, a circular nut on the feed-screw: 26, a circumferential groove in the periphery of the nut, the exterior of the nut diminishing in size each way from this groove: 27, a longitudinal groove in the periphery of the nut, there being one or more of these grooves, as desired: 28, a finger mounted for vertical movement in the carriage, the lower end of this finger having a longitudinal and transverse rib adapted to engage the circumferential and longitudinal grooves of the nut when the finger is in downward position: 29, a hand lever pivoted to the carriage and connected to the finger to serve in raising and lowering the finger so as to disengage it from and engage it with the nut: 30, a slotted connection between this hand-lever and tappet-arm 24 whereby when the hand-lever is moved to withdraw the finger from the nut, the tappet-arm is simultaneously moved so far from the tappet-rod as to be able to pass the tappets: 31, a feed-screw for the second operating section of the main trackway, this feed-screw being similar to the feed-screw of the first operative section of the trackway as to all of its provisions and accessories: 32, a similar feed-screw with accessories for the third operating section of the main trackway: and 33, a feed-screw with accessories for the fourth operating section of the main trackway.

Assume the carriage to be on the main trackway at the left thereof and in sliding engagement with the trackway, and assume the feed-screw to be in rotation and the finger to be up and free from the nut. Under these conditions the carriage will have no motion imparted to it by the screw, and the nut may turn with the screw. If, now, hand-lever 29 be depressed the lower end of the finger will engage the nut and accomplish two purposes. First, the longitudinal rib of the finger will engage the longitudinal groove of the nut and compel the nut to travel on instead of turn with the screw and, second, the transverse rib of the finger will engage the circumferential groove of the nut and compel the carriage to travel with the nut, in whichever direction the nut may be moving. Simultaneously the tappet-arm has been swung to position nearest the tappet-rod so as to come between the tappets. The carriage now moves endwise on the trackway till its tappet arm engages one of the tappets and shifts the tappet-rod and the belts and reverses the direction of the feed-screw, whereupon the carriage moves in the opposite direction till reversed by the other tappet, and so on, the carriage taking on a motion of reciprocation on the main trackway. The tappets are to be so adjusted upon the tappet-rod as to give to the excursions of the carriage a length in correspondence with the length of the glass plate to be beveled.

When the instrumentalities at the first operating section of the main trackway have completed their work upon the glass plate then the carriage is to be shifted to the second operating section of the main trackway, which second operating section is, as will be later explained, provided with its individual instrumentalities for a second operation upon the glass plate. When the carriage is to be shifted from the first to the second operating section of the main trackway, hand-lever 29 is to be raised, thus disengaging the finger from the nut and swinging the tappet arm out from between the tappets, and the handle of the cam-shaft of the carriage is to be actuated to bring the load of the carriage upon the wheels, whereupon wheel handle 12 may be operated to fleet the carriage along the main trackway from the first operating section to the second operating section and to such position that the finger may engage the second nut and the tappet arm take position between the second pair of tappets, the carriage then being lowered to sliding engagement with the trackway and taking up a motion of reciprocation in the second operating section of the trackway.

The tapered ends of the nuts will cause the idle finger, in approaching the nut, to rise and slide till its transverse rib can engage with the circumferential groove in the nut. The carriage may thus be shifted to successive operating sections of the main trackway and, if desired for any reason, may be shifted back to preceding operating section.

It has been assumed that when the carriage is moved from the first operating section into the second operating section, the nut of the second operating section will be in such position as to be engaged by the finger while the carriage is in such a position as to bring the tappet arm between the tappets of the second operating section. But it may well happen that when the carriage is shifted to the second operating section the nut of that section is found outside the normal range of travel of the carriage, and in such case, if the finger were engaged with the nut and the tappet-arm permitted to swing inward to normal position, the tappet-arm might engage the outer instead of the inner face of one of the tappets, which would be highly undesirable. Therefore, in such event, the nut having been engaged by the finger, the tappet-arm is to be swung outward by hand, the slot in connection 30 permitting this, and the carriage may be allowed to travel until the tappet-arm can swing down properly between the two tappets.

When one edge of the glass plate has had its bevel entirely completed the carriage is to be run upon the right-hand turntable and transferred to the return track and then put upon the lefthand turntable where the plate may be turned to bring a new edge into position to be operated upon, after which the carriage is run upon the initial end of the main trackway for the beginning of the beveling operation on the new edge. When all of the edges of the glass plate have been completely beveled then the plate may be removed and a new one placed upon the carriage.

It is manifest that the turning of the glass plate on the carriage, to bring a new edge into position to be operated upon, and the removal of the finished plate and the substitution of a new plate, may be effected at any desired point in the travel of the carriage, but economy of operations makes it preferable to do this work while the carriage is on the lefthand turntable, as that turntable represents the stage of carriage travel just preceding the beginning of beveling operations at the initial end of the main trackway.

Consideration is now to be given the instrumentalities arranged along the length of the main trackway for producing the bevel on the edge of the glass plate, it being understood that the plate will be supported by the carriage, in a manner hereinafter explained, in such manner as to present the plate at proper beveling angle to the grinding instrumentalities.

Continuing with the drawings:—34, indicates stretcher-pieces separating the main and return trackways, the stretcher-piece at present under consideration being the one at the initial operating section of the main trackway: 35, vertical slideways carried by this stretcher-piece contiguous to the inner face of the main trackway; 36, a spindle-bearing arranged to slide vertically in each of these slideways: 37, a vertical grinding-wheel spindle in each of these spindle bearings: 38, a grinding-wheel, formed of suitable abrasive material, mounted on the upper end of each grinding-spindle, these grinding wheels being adapted to present their flat faces upwardly and having, preferably, the cupped form illustrated: 39, a horizontal shaft supported in fixed bearings alongside the series of spindles 37, seven of the latter being shown in the illustration: 40, a pulley on this horizontal shaft by means of which rotation may be transmitted to the shaft by belt: 41, gearing, illustrated as being of spiral type, connecting horizontal shaft 39 with the several grinding spindles, whereby rotation of the horizontal shaft drives the seven grinding spindles simultaneously, the gearing being of such construction that the first grinding spindle will run in one direction and the second one in the opposite direction, and so on: 42, a vertically movable bar extending along under all the grinding spindles and provided with an aperture for a vertical screw under each grinding spindle and provided with a horizontal mortise at each of these apertures: 43, a screw disposed vertically under each of the vertical sliding frames 36 and passing through the vertical apertures in the bar 42: 44, a nut disposed on each of these screws within the mortises of the bar and adapted to be independently turned by hand: 45, a pair of vertical screws threaded into bar 42: 46, a worm-wheel fast on each of these screws: 47, a longitudinal shaft wormed to the pair of worm-gears: 48, a hand-wheel for turning the worm-shaft: and 49, sprocket-wheels and chain mechanism for transmitting motion from the hand-wheel to the worm-shaft.

A plate having been secured to the carriage in such position that its margin overhangs the carriage and is presented to the horizontal at proper angle to produce the desired bevel, the reciprocations of the carriage will move the glass plate to and fro along the series of grinding-wheels 38. These grinding-wheels are the roughing wheels and do the first and hardest work in the production of the bevel on the glass plate. By adjusting the nuts 44 the individual grinding-wheels are brought up to do their proper work upon the plate and, all of the wheels having been properly adjusted for their duty, the work proceeds. Then, as the grinding progresses, hand-wheel 48 is manipulated whereby the entire group of grinding stones is elevated, progressively, until the desired work of the roughing wheels is completed. When the next edge of the plate, or a new plate is to be subjected to the roughing operation, the several grinding-wheels will not require individual adjustment except in cases where one of the grinding-wheels shows excessive wearing away.

The object of having a series of the roughing wheels is to lessen the travel of the glass plate. For instance, if the plate be several feet wide there need be but a short travel, say a foot or so, in the roughing operation, and with very short plates one or two grinding-wheels may be all-sufficient. In other words, in doing the roughing on wide plates it is not necessary to run the plate off of the entire series of wheels, extreme accuracy not being called for in the roughing operation. This permits a very considerable shortening of a machine adapted for wide plates and, in addition to this, the simultaneous operation of a plurality of grinding-wheels shortens the time required in the roughing operation.

Proceeding with the drawings:—50, indicates a vertical spindle disposed alongside the main trackway in its second operating section: 51, a grinding-wheel, herein termed the medium grinder, on this spindle and adapted to operate on the beveled edge of the glass plate after it has been roughed in the first operating section: 52, mechanism, of an obvious character, for giving rotation to this medium grinder: 53, an adjusting screw under the spindle of the medium grinder: 54, a hand-wheel for vertically adjusting the medium grinder: 55, transmitting mechanism between the hand-wheel and the screw for vertically adjusting the medium grinder: and 56, a finishing grinder, generally similar as to mounting and attributes to the medium grinder, disposed in the third operating section of the trackway.

The plate having had its bevel roughed in the first operating section of the trackway, goes to the second operating section which, by means of the medium grinder past which the plate is reciprocated, has put upon it a further and more accurate beveling. After this the plate goes to the third operating section where the finishing grinder gives to it the final cutting finish ready for buffing.

Proceeding with the drawings:—57, indicates a shaft journaled alongside the main trackway in its final operating section: 58, a housing pivoted on this shaft: 59, a buffing cylinder journaled in this housing and adapted to engage under the beveled margin of the glass plate: 60, a housing for shaft 57, adapted to move to and from the main trackway: 61, pulleys on the ends of shaft 57 to which power may be transmitted by belt: 62, belts, which may be chain belts, transmitting motion from shaft 57 to the buffing cylinder: 63, a set-screw under housing 58 by means of which the buffing cylinder may be raised and lowered: 64, an oscillating shaft disposed below housing 60: 65, a crank: 66, a belt, which may be a chain-belt, for transmitting motion from shaft 57 to the crank: 67, a slotted arm on shaft 64, engaging the crank: 68, a rack on housing 60: and 69, a toothed segment on shaft 64

The plate having had its bevel roughed and medium ground and finished, goes to the final operating section of the main trackway so as to have its margin in position over the buffing cylinder. The buffing cylinder is then to be vertically adjusted, by means of screw 63, to bring its periphery into proper buffing relationship with the bevel of the glass. The buffing cylinder then proceeds to operate upon the bevel of the glass, the cylinder reciprocating inward and outward of the bevel so as to comprehend the entire surface of the bevel, and at the same time some degree of reciprocation is to be given to the glass to avoid the evil of pronounced transverse markings due to buffing. Very little reciprocation will answer the purpose and if the reciprocation be carried to considerable extent no harm can be done.

Attention will now be given to the construction of the carriage adapting it for the proper holding of a plate of glass and for permitting the plate to be adjusted to suit the bevel desired.

Proceeding with the drawings:—70, indicates a pair of vertically moving hinge-plungers mounted in the carriage-base: 71, a cam-shaft mounted in housings in the carriage-base parallel with the trackway: 72, cams on the cam-shaft engaging under the plunger 70: 73, a hand-wheel geared to shaft 71: 74, the glass-carrying table hinged to the upper ends of plungers 70, the plate of glass to lie on this table and to be clamped thereto by suitable appliances: 75, a plunger mounted for vertical movement in the carriage-base and provided with rack teeth: 76, a link connecting the upper end of this plunger with the table at a point somewhat distant from the hinge connecting the table with plungers 70: 77, a shaft mounted in the carriage-base: 78, a pinion on this shaft, engaging plunger 75: 79, a notched wheel on shaft 74: 80, a lever pivoted on shaft 77 at wheel 79 and provided with a spring finger adapted to engage any selected notch in that wheel: 81, a weight suspended from lever 80, at selective points in the length thereof: 82, a gage supported by the carriage-base in position over the outer portion of table 74 and adapted to limit the upward motion of that table on its hinge: and 83, a stop to limit the descent of the outer edge of the table so that when not adjusted for some particular bevel the table will be substantially level.

The glass plate to be beveled is to be laid upon table 74, preferably upon a suitable rubber cushion, and, by means of hand-wheel 73 the hinge of the table is to be vertically adjusted to desired position in view of the bevel to be produced upon the glass plate. Gage 82 is then to be so adjusted that when the outer portion of the table engages upwardly against it the proper bevel will be determined for the glass plate. Hand-lever 80 is then to be adjusted on wheel 79 to some suitable position above the horizontal and weight 81 is to be connected with such point in the length of that lever that the weight will move the outer edge of the table upwardly and produce such a degree of downward pressure at the inner edge of the table as will bring the margin of the glass plate into contact with the grinding-wheels with the desired degree of pressure. Under these conditions the glass plate is set into reciprocation along the series of roughing wheels and, as the grinding proceeds, the weight 81 urges the margin of the glass downward toward the wheels with proper grinding pressure, and this continues until the outer edge of the table reaches gage 82, whereupon the roughing work is completed.

Attention will now be given the facilities provided for clamping the plate of glass to the table and for facilitating its removal. The grinding is done under wet conditions and the result is that when a plate is to be shifted upon or removed from the table there is an adhesion hampering the operation. I provide mechanism for breaking down this adhesion.

Proceeding with the drawings:—84, indicates brackets rising from the table: 85, a clamp, preferably of finger construction, arranged to slide vertically in these brackets and engage the upper surface of the glass direct or through the medium of a suitable cushion, as of rubber: 86, a cam-shaft arranged over the clamp: 87, cams thereon: 88, yokes engaging the cams: 89, posts slidingly connecting the clamp with the yokes: 90, springs acting between the clamp and the yokes to cause the descent of the yokes to exert elastic pressure upon the clamp: 91, a lever fast on cam-shaft 86: 92, a fixed detent segment engaged by detent mechanism on lever 91 to hold the lever in adjusted position: 93, a series of lifting shafts disposed under table 74 parallel with each other: 94, a number of arms fast on each of these lifting shafts and projecting upwardly therefrom: 95, a roller on the upper end of each of arms 94, these rollers working up through openings in the table and adapted, as the arms are swung upward, to project above the upper surface of the table: 96, a link extending at right angles to shafts 93 and connected with one of the arms 94 on each of those shafts: and 97, a hand-lever fast with one of shafts 93.

A plate of glass having been placed upon the table, the table having been put or to be later put in proper angular adjustment with reference to the carriage-base lever 91 is to be manipulated to bring the clamp down upon the glass or upon such cushioning substance as may be interposed between the clamp and the glass. Affairs are now in condition to subject the margin of the glass-plate to the action of the roughing wheels.

When the work is finally done upon the edge of the glass and it is desirable to lift the plate and to turn it to put a new edge into proper position relative to the table, the clamp is to be released and then, as before stated, it will often be found that the plate tenaciously adheres to the table. Hand-lever 97 is now to be actuated to move rollers 95 upwardly, the result being that the plate is not only forced up from the table, but the plate is temporarily supported on rollers tending to facilitate certain manipulations of the plate. While the plate is being readjusted the plate may find support upon the rollers free from the effect of the adhesion which might take place between the plate and the table, and at any time before or after the adjustment of the plate upon the table has been effected the lifting handle may be released and the plate permitted to come down solidly upon the table.

In setting a new plate of glass upon the table, or in turning a plate and bringing a new edge into position for action, it is desirable to avoid the necessity for measuring a relationship of the edge of the glass to the table. Understanding, as has been before adverted to, that it is preferable to remove and place and adjust the plate of glass while its carriage is on the initial turntable 4, I provide at that turntable, in preference to any other point upon the machine, a gage to facilitate the setting of the plate of glass.

Continuing with the drawings:—98, indicates a standard rising from turntable 4: and 99, a gage carried at the top of the standard and adapted to be engaged by the edge of a plate of glass properly clamped upon the table.

A plate of glass having been properly set upon the table and gage 99 having been set against the edge of the plate and fixed, that gage will thereafter serve in setting other edges of similar glass plates, either other edges of the same plate or the edges of other plates. The adjustability of the gage is not essential but it is highly desirable in view of the fact that the overhang of the glass plate beyond the edge of the table should not be more than is necessary to provide for grinding the proper bevel, and this is especially true with thin plates.

Mention has heretofore been made of adjusting the grinding agents upwardly as the grinding proceeeds but it is to be understood that this is necessary only in case the margin of the glass plate being operated upon has no movement of its own, as, for instance, if the glass plate were fixedly secured to the carriage at the proper angle for the desired bevel. But in the present instance, where the glass plate tips upon the table-hinge while the work is progressing, it is that progressive tipping which produces the feeding, and the grinding agents will not require vertical adjustment except such as is needed to compensate for the wearing away of the grinding wheels.

The axes of the grinding wheels have been referred to as being vertical but it is desirable that under certain circumstances they be not truly so. When the bevel of the glass plate slides along over the flat surface of a wheel, forming a chord to the circle of the wheel, loose grains of abrasive material are apt to be carried aggressively against the face of the plate within the beveled margin and damage the flat surface of the plate. To avoid this I set the axes at a slight angle to the face of the bevel, as will be apprehended from Fig. 8. The face of the wheel being flat to start on it shortly wears to a bevel and the glass will not be acted upon by more than half of the length of the chord of the wheel-circle represented by the bevel. Under these conditions the loose grains of abrasive material, instead of doing damage to the clear face of the glass, become crushed under the buffer and do no harm.

Mention has been made of the fact that in the series of roughing wheels the alternate wheels turn in one direction and the intermediate wheels in the opposite direction. This causes the scorings produced by one wheel to be crossed by and fairly compensated for by the scorings of the next wheel, thus materially lessening the duty of the intermediate and finishing grinders.

Provision is made for vertically gaging the grinding wheels, this being done by a gage roller adapted to engage the face of the grinding wheel while it is being adjusted, this matter being best illustrated in Fig. 5 in which:—100, indicates a bracket supported by the housing of the grinding wheel: 101, a lever pivoted to the bracket and having an end projecting over the rim of the grinder: 102, a roller mounted in the inner end of the lever and adapted to engage downwardly on the rim of the wheel: 103, a spring coöperating with the roller-lever and tending to elevate the roller away from the wheel: 104, a top lever pivoted to the bracket over the roller lever: 105, a link connecting the outer ends of the two levers: 106, a hollow adjusting screw threaded through a portion of the bracket over the free end of the upper lever: and 107, a headed pin passing through the adjusting screw and having its lower end in engagement with the upper lever.

Adjusting screw 106 is to be so adjusted that when the pin is depressed till its head comes in contact with the top of the screw, the gaging roller will be brought down to the level at which the surface of the grinding-wheel should be. The pin is to be depressed by hand whenever gaging of the grinding wheel is to be done and when the pin is released then the roller at once rises from the grinding wheel thus avoiding wear.

It is to be understood that the details of construction of my machine are subject to many modifications without departing from the spirit of my invention.

I have simply explained the principle of my invention and set forth the best embodiment of that principle within my present contemplation.

I claim:—

1. A glass beveling machine comprising, a trackway, a plate-carriage adapted to slide thereon and provided with plate-clamping devices, disengageable means for reciprocatingly sliding said carriage on said trackway, wheels mounted for vertical adjustment relative to the carriage and adapted to engage said trackway, mechanism for raising the carriage relative to the trackway so as to throw the load of the carriage upon said wheels, a handle to serve in turning a pair of the wheels, a grinding-wheel spindle journaled in fixed position relative to said carriage and presenting its end toward the margin of a glass plate on the carriage, means for rotating said spindle, and a grinding-wheel carried by said spindle and adapted to have its flat face in engagement with the margin of the glass plate, combined substantially as set forth.

2. A glass beveling machine comprising, a trackway constituting a plurality of operating sections, a plate-carriage adapted to travel on the trackway on the operating sections thereon and between said sections and provided with plate-clamping devices, a grinding-wheel spindle journaled in fixed position in each operating section of the trackway and presenting its end toward the margin of a glass plate on the carriage, means for rotating said spindle, a grinding-wheel carried by each spindle and adapted to have its flat face in engagement with the margin of the glass plate, an independent carriage-reciprocating mechanism disposed in each of the operating sections of said trackway and adapted to have the carriage connected to and disconnected from it, and means for shifting the carriage from one operating section of the trackway to the other, combined substantially as set forth.

3. A glass beveling machine comprising, a trackway constituting a plurality of operating sections, a plate-carriage adapted to travel on the trackway on the operating sections thereof and between said sections and provided with plate-clamping devices, a grinding-wheel spindle journaled in fixed position in each operating section of the trackway and presenting its end toward the margin of a glass plate on the carriage, means for rotating said spindles, a grinding-wheel carried by each spindle and adapted to have its flat face in engagement with the margin of the glass plate, an independent feed-screw mounted longitudinally in each of the operating sections of the trackway, driving and reversing mechanism for giving to said screws rotation in either direction, an independent tappet-rod disposed alongside each operating section of the trackway and provided with tappets and operatively connected with the reversing mechanism of its operating section, mechanism for connecting the carriage with and disconnecting it from said feed-screws, a tappet-arm mounted on the carriage and adapted to engage said tappets, and mechanism for moving said tappet-arm out of operative relationship with one tappet-rod and into operative relationship with another tappet-rod when the carriage is moved from one to another operating section of the trackway, combined substantially as set forth.

4. A glass beveling machine comprising a trackway constituting a plurality of operating sections, a plate-carriage adapted to travel on the trackway on the operating sections thereof and between said sections and provided with plate-clamping devices, a grinding-wheel spindle journaled in fixed position in each operating section of the trackway and presenting its end toward the margin of a glass plate on the carriage, means for rotating said spindle, a grinding-wheel carried by each spindle and adapted to have its flat face in engagement with the margin of the glass plate, an independent feed-screw mounted longitudinally in each of the operating sections of the trackway, driving and reversing mechanism for giving said screws rotation in either direction, a nut on each of the feed screws, a vertically movable finger mounted on the carriage and adapted to engage each of said nuts and prevent the nut from rotating or from moving endwise relative to the carriage, and a hand-lever for raising and lowering said finger, combined substantially as set forth.

5. A glass beveling machine comprising, a trackway constituting a plurality of operating sections, a plate-carriage adapted to travel on the trackway on the operating sections thereof and between said sections and provided with plate-clamping devices, a grinding-wheel spindle journaled in fixed position in each operating section of the trackway and presenting its end toward the margin of a glass plate on the carriage, means for rotating said spindle, a grinding wheel carried by each spindle and adapted to have its flat face in engagement with the margin of the glass plate, an independent feed-screw mounted longitudinally in each of the operating sections of the trackway, driving and reversing mechanism for giving said screws rotation in either direction, a nut on each of the feed screws, a vertically movable finger mounted on the carriage and adapted to engage each of said nuts and prevent the nut from rotating or from moving endwise relative to the carriage, a hand-lever for raising and lowering said finger, and guiding surfaces on the end of said nuts to elevate said finger as the finger reaches a nut during the sliding motion of the carriage while disconnected from the nuts, combined substantially as set forth.

6. A glass beveling machine comprising, a trackway constituting a plurality of operating sections, a plate-carriage adapted to travel on the trackway on the operating sections thereof and between said sections and provided with plate-clamping devices, a grinding-wheel spindle journaled in fixed position in each operating section of the trackway and presenting its end toward the margin of a glass plate on the carriage, means for rotating said spindle, a grinding-wheel carried by each spindle and adapted to have its flat face in engagement with the margin of the glass plate, an independent feed-screw mounted longitudinally in each of the operating sections of the trackway, driving and reversing mechanism for giving said screws rotation in either, a nut on each of the feed screws, a vertically movable finger mounted on the carriage and adapted to engage each of said nuts and prevent the nut from rotating or from moving endwise relative to the carriage, a hand-lever for raising and lowering said finger, an independent tappet-rod disposed alongside each operating section of the trackway and provided with tappets and operatively connected with the reversing mechanism of its operating section, a tappet-arm movably mounted on the carriage and adapted to engage between the tappets on a given one of the tappet rods, and a connection between said hand-lever and said tappet-arm whereby the tappet-arm will be moved from active position when said finger is elevated to disengage it from a nut, combined substantially as set forth.

7. A glass beveling machine comprising, a main trackway, a plate-carriage adapted to travel thereon and provided with plate-clamping devices, grinding instrumentalities disposed along the length of said main trackway and adapted to operate on the margin of a glass plate mounted on the carriage, a return trackway parallel with the main trackway, and transfer devices at the ends of the pair of trackways for shifting the carriage from one trackway to the other, combined substantially as set forth.

8. A glass beveling machine comprising, a main trackway, a plate-carriage adapted to travel thereon and provided with plate-clamping devices, grinding instrumentalities disposed along the length of said main trackway and adapted to operate on the margin of a glass plate mounted on the carriage, a return trackway parallel with the main trackway, and reversing and transfer mechanism at the ends of the pair of trackways to serve in receiving the carriage from one trackway and in reversing it endwise and placing it in alinement with the other trackway, combined substantially as set forth.

9. A glass beveling machine comprising, a main trackway, a plate-carriage adapted to travel thereon and provided with plate-clamping devices, grinding instrumentalities disposed along the length of said main trackway and adapted to operate on the margin of a glass plate mounted on the carriage, a return trackway parallel with the main trackway, and a turntable at each end of the pair of trackways adapted to receive the carriage from one trackway and turn it endwise and place it in alinement with the other trackway, combined substantially as set forth.

10. A glass beveling machine comprising, a trackway adapted to be engaged by sliding and rolling members on a carriage mounted on the trackway, a carriage mounted to slide on the trackway, wheels mounted on the carriage and engaging the trackway and normally free from carriage-load but adapted for downward adjustment so as to take the carriage-load, a series of independent carriage-reciprocating mechanisms disposed along the trackway, operative mechanism to serve in connecting the carriage with either of the carriage-reciprocating mechanisms, means for disconnecting the carriage from any carriage-reciprocating mechanism with which it may be connected, and devices for throwing the load of the carriage upon said wheels when the carriage is disconnected from the carriage-reciprocating mechanism, combined substantially as set forth.

11. A glass beveling machine comprising, a trackway, a plate carriage adapted to slide thereon and provided with plate-clamping devices, grinding instrumentalities disposed along the length of the trackway, wheel-shafts mounted in said carriage, wheels on said wheel-shafts adapted to engage the trackway, vertically movable bearings for the wheel-shafts, a cam-shaft disposed over each wheel-shaft and having cams to engage said bearings, a handle for angularly adjusting one of the cam shafts, arms on the cam-shafts, and a link connecting the arms on the cam-shafts, combined substantially as set forth.

12. A glass beveling machine comprising, a trackway, a plate-carrying carriage adapted to travel on the trackway and provided with plate-clamping devices, a series of vertical spindles disposed along one side of the trackway in position to be under the projecting edge of a glass plate carried by the carriage, a grinding wheel on the upper end of each spindle adapted to engage the glass by its flat face, and mechanism for independently adjusting said spindles vertically, combined substantially as set forth.

13. A glass beveling machine comprising, a trackway, a plate-carrying carriage adapted to travel on the trackway and provided with plate-clamping devices, a series of vertical spindles disposed along one side of the trackway in position to be under the projecting edge of a glass plate carried by the carriage, a grinding wheel on the upper end of each spindle adapted to engage the glass by its flat face, and mechanism for simultaneously adjusting the series of spindles vertically, combined substantially as set forth.

14. A glass beveling machine comprising, a trackway, a plate-carrying carriage adapted to travel on the trackway and provided with plate-clamping devices, a series of vertical spindles disposed along one side of the trackway in position to be under the projecting edge of a glass plate carried by the carriage, a grinding wheel on the upper end of each spindle adapted to engage the glass by its flat face, and mechanism for adjusting said spindle independently and simultaneously, combined substantially as set forth.

15. A glass beveling machine comprising, a trackway constituting a plurality of operating sections, a plate-carrying carriage adapted to travel along the trackway and provided with plate-clamping devices, grinding instrumentalities alongside the trackway in one of its operating sections and adapted to cut the bevel upon the edge of a glass plate held by the carriage, a buffing cylinder mounted alongside the trackway in another operating section thereof and having a length as great as that of the glass edge to be dealt with, and mechanism for reciprocating the buffing cylinder in a direction transverse to its axis and the trackway, combined substantially as set forth.

16. A glass beveling machine comprising, a trackway constituting a plurality of operating sections, a plate-carrying carriage adapted to travel along the trackway and provided with plate-clamping devices, grinding instrumentalities alongside the trackway in one of its operating sections and adapted to cut the bevel upon the edge of a glass plate held by the carriage, a buffing cylinder mounted alongside the trackway in another operating section thereof and having a length as great as that of the glass edge to be dealt with, mechanism for reciprocating the buffing cylinder in a direction transverse to its axis and the trackway, and mechanism for reciprocating the carriage lengthwise of the buffing cylinder while the buffing cylinder is reciprocating transversely of its axis, combined substantially as set forth.

17. A glass beveling machine comprising, a trackway, a plate-carrying carriage adapted to travel on the trackway and provided with plate-clamping devices, a plurality of grinding wheels arranged in series along said trackway and adapted to operate with their flat faces on the edge of a glass plate held by the carriage, and mechanism for rotating successive grinding wheels in opposite directions, combined substantially as set forth.

18. A glass beveling machine comprising, a trackway, grinding agents disposed alongside the trackway, a carriage adapted to travel on the trackway, a table mounted on the carriage and provided with glass clamping devices, a hinge connecting the table with the carriage and having an axis parallel with the trackway, mechanism carried by and traveling with the carriage for vertically adjusting the edge of the table farthest from the trackway, and a weighted lever mounted on the carriage coöperating with said adjusting mechanism and adapted to urge downwardly the edge of the table nearest the trackway, combined substantially as set forth.

19. A glass beveling machine comprising, a trackway, grinding agents disposed alongside the trackway, a carriage adapted to travel on the trackway, a table mounted on the carriage and provided with glass clamping devices, and a gage disposed in fixed position to be traversed by the carriage and adapted to position the edge of a plate of glass upon the table, combined substantially as set forth.

20. A glass beveling machine comprising, a glass carrying table provided with mechanism for clamping a plate glass thereto, and lifting devices operating up through the table to elevate the plate from the table when unclamped, combined substantially as set forth.

21. A glass beveling machine comprising, a table provided with clamping mechanism adapted to clamp a glass plate thereto, vertically movable rollers adapted to move up through the table and elevate the glass plate therefrom when unclamped, and mechanism for raising and lowering said rollers, combined substantially as set forth.

22. A glass beveling machine comprising, a trackway, a plate carriage adjusted to travel thereon and provided with plate-clamping devices, means for moving said carriage on said trackway, a grinding-wheel spindle journaled in fixed position relative to said carriage and presenting its end toward the margin of a glass plate on the carriage and having its axis at an angle to the plane of the bevel to be produced, means for rotating said spindle, and a grinding-wheel carried by said spindle and adapted to have its face in engagement with the margin of the glass plate, combined substantially as set forth.

23. A glass beveling machine comprising, a trackway, a plate-carriage adapted to travel thereon and provided with plate-clamping devices, means for moving said carriage on said trackway, a grinding-wheel spindle journaled in fixed position relative to said carriage and presenting its end toward the margin of a glass plate on the carriage, means for rotating said spindle, a grinding-wheel carried by said spindle and adapted to have its flat face in engagement with the margin of the glass plate, a gaging lever fixedly supported near the grinding-wheel and having its free end projecting over the face of the wheel, a roller carried by the free end of the gaging lever and adapted to make contact with the face of the grinding-wheel, a spring coöperating with the gaging-lever and adapted to hold the roller out of engagement with the grinding-wheel, means for depressing the free end of the gaging-lever, and an adjustable stop to limit the descent of the free end of the gaging-lever, combined substantially as set forth.

24. A glass beveling machine comprising, a trackway, a plate-carriage adapted to travel thereon and provided with plate-clamping devices, means for moving said carriage on said trackway, a grinding-wheel spindle journaled in fixed position relative to said carriage and presenting its end toward the margin of a glass plate on the carriage, means for rotating said spindle, a grinding-wheel carried by said spindle and adapted to have its flat face in engagement with the margin of the glass plate, a gaging-lever fixedly supported near the grinding-wheel and having its free end over the face of the wheel, a gage roller carried by the free end of the gaging-lever and adapted to make contact with the face of the grinding-wheel, a spring coöperating with the gaging-lever and holding the roller normally away from the face of the wheel, a second lever connected with the gaging-lever, a hollow adjustable screw over the free end of the second lever, and a headed pin working through the hollow screw and engaging the free end of the second lever, combined substantially as set forth.

GEORGE M. TREMMEL.

Witnesses:
EDWARD J. SORK,
H. C. GOWRAN.